April 24, 1962 — E. P. TOMASZEK ETAL — 3,030,817
TOROIDAL ACTUATOR
Filed March 21, 1961 — 2 Sheets-Sheet 1

INVENTORS.
EDWARD P. TOMASZEK
LELAND R. SMITH
BY Alden D. Redfield
Irwin P. Garfinkle
ATTORNEYS.

INVENTORS.
EDWARD P. TOMASZEK
BY LELAND R. SMITH
ATTORNEYS.

3,030,817
TOROIDAL ACTUATOR
Edward P. Tomaszek, Shelton, and Leland R. Smith, Seymour, Conn., assignors to Avco Corporation, Stratford, Conn., a corporation of Delaware
Filed Mar. 21, 1961, Ser. No. 97,282
8 Claims. (Cl. 74—200)

This invention relates to a toroidal actuator capable of producing an output velocity as a function of roller position, and more particularly to a toroidal actuator having a power input shaft which is rotatably driven in one direction, and an output shaft with resultant rotation in either direction or stopped depending on the position of the rollers relative to the toroids.

Briefly described, one driven and two driving toroidal disks are mounted coaxially on a rotatably driven input shaft, the two driving disks being fixed to the input shaft, and the driven disk being rotatably mounted intermediate the fixed disks. First and second sets of rollers are positioned in tractive contact between the races of the disks, one set of rollers being adjustable, and the second set of rollers being fixedly supported from a carrier which is drivingly connected to the output shaft. When both sets of rollers are in predetermined positions on the respective races, the output shaft remains stationary; but when the positions of the rollers are altered by tilting the axes of the adjustable rollers to change the driving ratio between the driven and one driving disk, the second set of rollers revolves about the axis of the shafts to drive the output shaft in a forward or reverse direction at a speed depending upon the relative positions of the rollers. Unique means are provided for tilting the axis of the adjustable rollers.

For the purpose of providing a clearer understanding of the precise nature of this invention, certain expressions used in this specification are defined as follows:

"Axis of rotation of the roller" or "roller axis" means that axis about which the roller rotates in rolling on the races of the disks.

"Contact axis of the roller" means that axis joining the points of contact of the roller with the races of the disks; the contact axis is that axis about which the position of the rollers is altered by a "steering" action.

"Axis of precession of the roller" is that axis about which the rollers are shifted or tilted to change the speed ratio between the various driving and driven disks.

In toroidal disk transmissions a roller is positioned in traction between two coaxial disks having toroidally shaped races, the roller being arranged for rotation in a circular path in the race of each toroid. The ratio of the radial distances of the points of contact (or the circular paths) in each race from the axis of rotation of the disks determines the relative speeds of rotation of the disks. In order to change the relative speeds, the rollers are shifted about the axis of precession so that the rollers then rotate in different circular paths, thus changing the ratio of the radial distances. This shifting can be accomplished by forcibly and bodily moving the rollers from one point of contact to another, but this method requires a considerable force and results in excessive wear both on the toroid races and on the rollers. In order to avoid these unfortunate results, many systems have been developed for causing the roller to "ride" into its new position without significant friction. These systems involve a steering of the rollers from one circular path into another circular path, this action being accompanied by a precessing into the final position. A primary object of this invention is to provide an improved actuator for producing effective precession of the rollers with minimum forces and resulting in negligible wear.

Another object of this invention is to provide a toroidal actuator which is a mechanical integrator utilizing a variable ratio traction type principle to produce an output velocity and direction as a function of position.

Another object of this invention is to provide an actuator for controlling the speed and direction of an output shaft in accordance with position.

For other objects and a better understanding of the precise nature of this invention, reference is now made to the following detailed specification and to the accompanying drawings in which.

Figure 1:
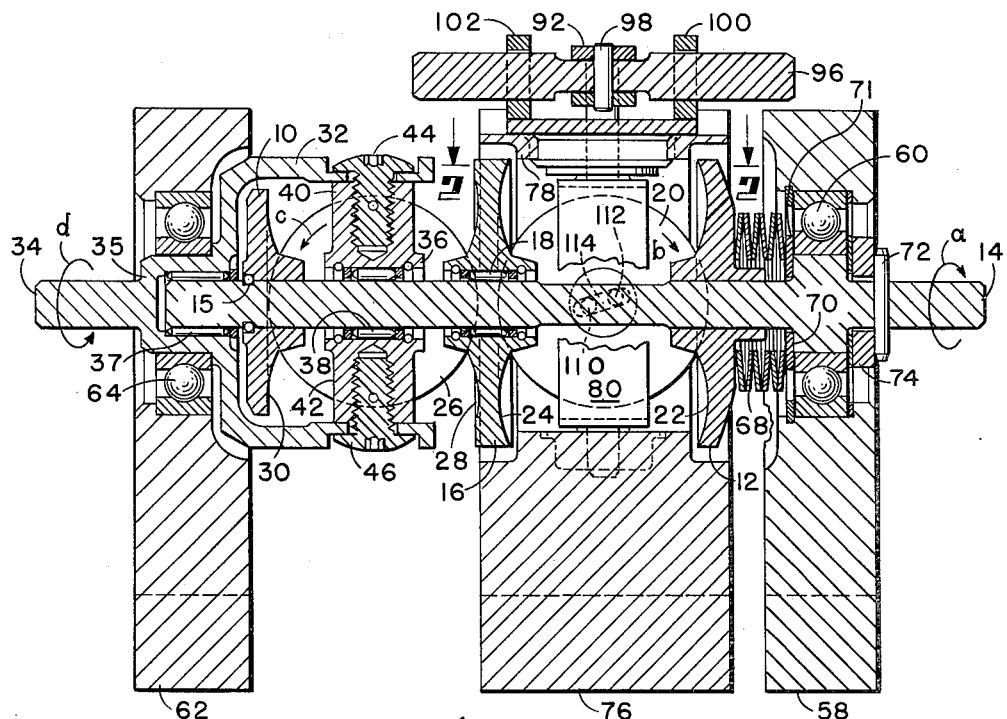
FIG. 1 is a cross-sectional side elevation of the preferred embodiment of this invention.

In the mechanism shown in the drawings, driving disks 10 and 12 are mounted on an input shaft 14 driven from any suitable power source (not shown). The position of the disk 10 is maintained on the shaft 14 and is fixed longitudinally by means of a retaining ring 15, while both disks are constrained from rotation relative to the shaft by means of slot and key arrangements 17. A driven disk 16 is mounted on the shaft 14 intermediate the driving disks, but is freely rotatable with respect to the shaft 14 on needle bearings 18. A pair of rollers 20 is positioned in tractive engagement with the opposed toroidal races 22 and 24 of the disks 12 and 16 respectively, while a second pair of rollers 26 is mounted in tractive relationship with the opposed races 28 and 30 of the disks 16 and 10 respectively. As will be described in more detail below, the angular positions of the rollers 20 are each adjustable about its axis of precession and its contact axis so as to adjust the alignment of the rollers 20 with respect to the rollers 26, the angular positions of which are fixed on those axes.

The rollers 26 are carried by a U-shaped carrier 32 which is integral with the output shaft 34. The shaft 34 is provided with an enlarged hollow portion 35 in which the input shaft 14 is rotatably supported on needle bearings 37, and thus shafts 14 and 34 are axially aligned.

Figure 2:
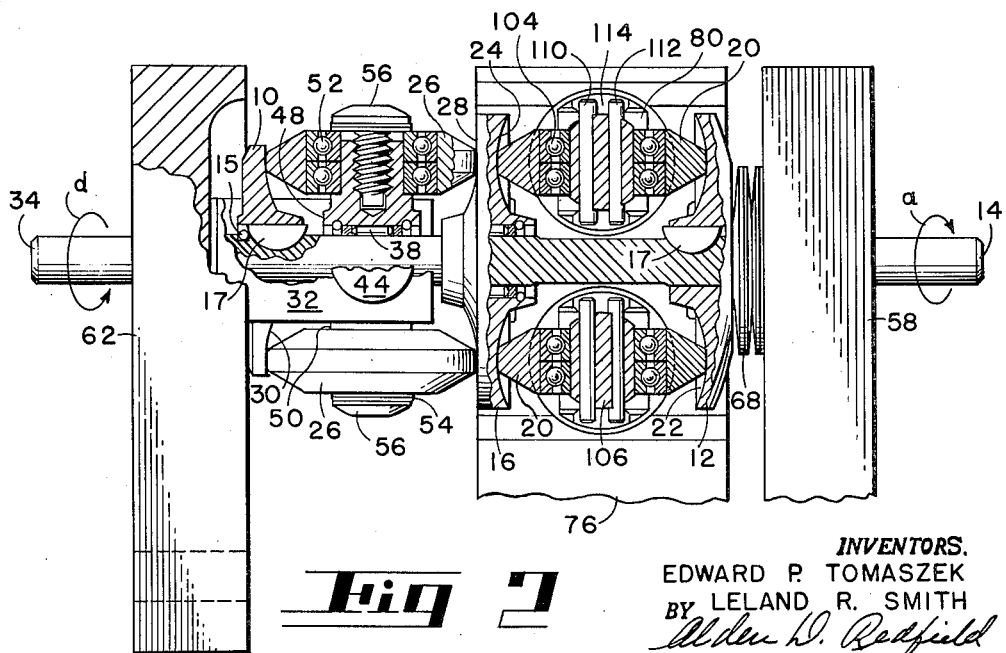
FIG. 2 is a bottom view, partially in section.

As may best be seen in FIGS. 1 and 2, U-shaped member 32 carries the support for the rollers 26 which comprises a four-spoke hub 36 which is rotatably mounted on the input shaft 14 by means of needle bearings 38. Two alternate spokes 40 and 42 of the hub are secured to the U-shaped carrier 32 by means of screws 44 and 46 respectively, while the rollers 26 are rotatably supported by spokes 48 and 50 on bearings 52, and are secured by means of washers 54 and screws 56.

The support for the shafts 14 and 34 include a bearing housing 58 for containing bearings 60 on which one end of the input shaft 14 is rotatably supported, and a bearing housing 62 for containing bearings 64 on which the output shaft 34 is rotatably supported. As indicated before, the other end of the input shaft 14 is supported on needle bearings 37 within the enlarged hollow portion 35 of the output shaft 34.

The entire assembly of disks and rollers must be maintained in sufficient compression to provide traction, and for this purpose a spring 68 is concentrically positioned on the input shaft 14, one end of the spring bearing against the disk 12 and the other end bearing against a shoulder 70 on the shaft 14 and a washer 71. Since the disk 10 is anchored longitudinally by the retaining ring 15 while the disk 12 has some freedom of longitudinal motion due to the slot and key arrangement 17, the spring 68 will tend to compress the disks and rollers. A pin 72 projecting through the input shaft 14 and a washer 74 provide a positive locking connection of the shaft 14 within the bearings 60.

To provide means for adjustment of the alignment of the roller 20 relative to the roller 26, the roller 20 is suitably mounted between a supporting base 76 and a cover 78, and means are provided for permitting simultaneous rotation of the rollers on each of the three previously defined axes; namely, the axis of rotation, the contact axis, and the axis of precession.

Figure 3:
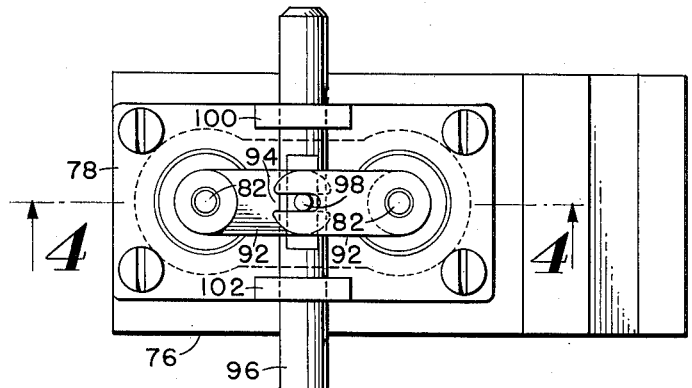
FIG. 3 is a view showing the roller actuator.

The steering mechanism for each of the two rollers 20 (see FIG. 4) comprises a yoke 80 having an integral shaft 82 rotatably supported by bearings 84 in the cover 78, and an integral shaft 86 rotatably supported by bearings 88 in the support base 76, the shaft 82 and the shaft 86 being coaxial. Each shaft 82 (see FIG. 3) is secured by means of a pin 90 to one end of a link 92, the other end of each link 92 having a slot 94. An actuating shaft 96 carrying a pin 98 is positioned on the cover 78 for axial movement within supports 100 and 102. Since the pin 98 is positioned in the slot 94 of both links 92, axial movement of the control shaft 96 will result in rotation of each of the yokes 80.

Figure 4:
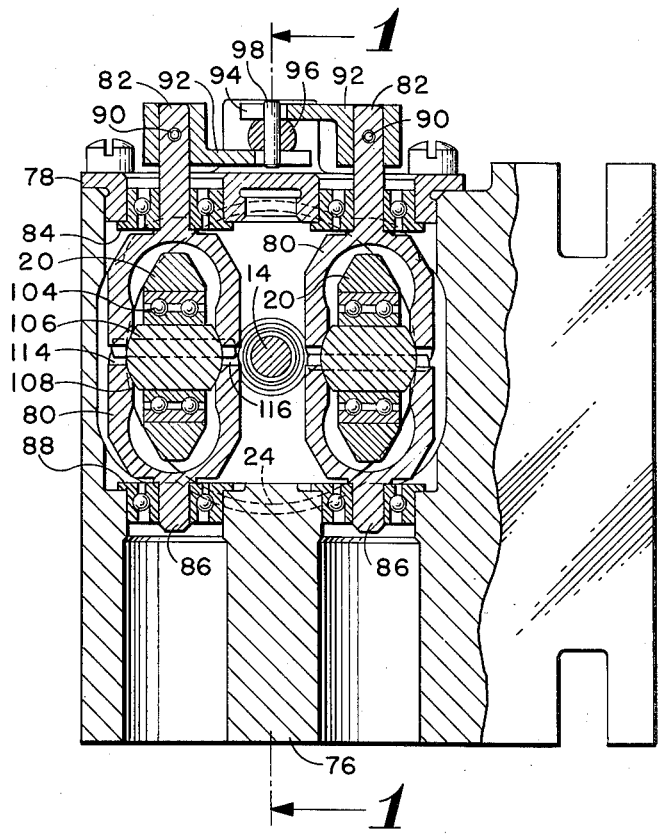
FIG. 4 is a sectional end view of this invention.

As may best be seen in FIG. 4, the rollers 20 are each mounted on bearings 104 to permit free rotation on the roller axis. To permit simultaneous steering and precessing actions, the bearings 104 are, in turn, mounted on a ball member 106 which, in turn, is positioned within a contoured portion of the yoke 80 which, in effect, provides a socket member 108. The main support for the roller is provided by two spaced pins 110 and 112 which extend through the ball 106 and through slots 114 and 116 in opposite walls of each yoke 80.

It will be noted that the pins 110 and 112 and the slots 114 and 116 are disposed at an angle relative to the axis of the input shaft 14, and that the length of the slot exceeds the spacing of the pins. Due to this angular relationship rotation of the yoke 80 on its shafts 82 and 86 brings the surfaces of the slots to bear against the pins 110 and 112, and imparts forces to the pins, having one component tending to rotate the roller on its contact axis and another component tending to rotate the roller on the axis of precession. Rotation of the roller 20 on the contact axis tends to steer the roller from one circular path in the races 22 and 24 to another path, while at the same time the other component tends to shift the roller about its axis of precession. While the support for the roller in the illustrated embodiment comprises two spaced pins 110 and 112, it will be readily understood that many other configurations will serve the same function; for example, a flat beam or any structure providing the spaced edged surfaces against which the yoke can bear is suitable.

In the operation of the invention, when the disk 16 is driven at the same speed by both the roller 20 and the roller 26, the output shaft 34 will remain stationary. However, if the position of the roller 20 on the races 18 and 22 is shifted, then the rollers 26 and 20 will be attempting to drive the disk 16 at different speeds, and this difference will be absorbed by the revolving (or precessing) of the roller 26 about the axis of the shaft 34. Since the rollers 26 are coupled to the U-shaped carrier 32, which is integral with the output shaft 34, rotation of the output shaft 34 results. Assuming rotation of the input shaft 14 in the direction of the arrow "a," then rollers 20 and 26 will rotate in the directions indicated by the arrows "b" and "c," respectively. If the roller 20 is rotating at a faster rate than the roller 26, the output shaft 34 will rotate in the direction indicated by the arrow "d" while rotation in the opposite direction will result if the roller 20 is rotating at a slower rate than roller 26.

To produce a change in the speed of rotation of the roller 20, the actuating shaft 96 is moved longitudinally in either direction. If it is moved to the right, as illustrated in FIG. 1, the yoke 80 is rotated counterclockwise and the lower surface of the slot 114 and the upper surface of the slot 116 will bear against the pins 110 and 112, thereby causing the roller 20 to steer outwardly on the race 24 of disk 16 and inwardly on the race 22 of disk 12, causing the disk 16 to run at a higher rate of speed and producing rotation of the output shaft 34 in the direction indicated by the arrow "d."

Note that each of the rollers 20 steers on its contact axis, and simultaneously shifts on its axis of precession when the yoke 80 is rotated. However, these actions will continue only while the surfaces of the slots 114 and 116 bear against the pins 110 and 112. Steering and precessing cease when the pins 110 and 112 assume positions within the slots 114 and 116 where there is no pressure. When there is no further precessing, the output shaft 34 runs at a speed and in a direction determined by the position of the yoke 80, or governed by the position of the actuating shaft 96. This means that if the actuating shaft 96 is connected to an error sensing device, for example, a centrifugal speed governor, an error will automatically be integrated by this device. That is to say, any error sensed by the shaft 96 is resolved as a directional velocity at the output shaft 34. It is seen, therefore, that we have produced a toroidal actuator which is a mechanical integrator device utilizing a variable ratio traction type principle to produce an output velocity as a function of its roll position.

The invention as actually reduced to practice was found practical for controlling relative speeds of rotating machines and for measuring or changing the speeds quickly without disconnecting. It was found that the actuator constructed in accordance with this invention was capable of delivery of eight times higher torque output as compared with conventional ball disk integrators of about the same size. It was also found that there was negligible wear on contact surfaces and there was a high degree of accuracy. Operation in temperature ranges from —65° F. to +600° F. was achieved. The over-all size of the device as actually constructed and tested was 1½ inches by 1½ inches by 3⅞ inches and it weighed about one-half pound.

While only a single preferred embodiment of this invention has been illustrated, it is clear that many modifications and adaptations may be made without departing from the spirit of the invention. For example, the output shaft need not be positioned coaxially with the input shaft but may be driven from a ring gear supported by the roller carrier or by any other suitable means. For that reason it is intended that this invention be limited only by the scope of the following claims interpreted in the light of the prior art.

What is claimed is:

1. In a toroidal actuator, the combination comprising: a rotatable input shaft, first and second disks coaxially mounted on said input shaft and fixed for rotation therewith, a third disk mounted coaxially with said input shaft intermediate said first and second disks, said third disk being freely rotatable with respect to said input shaft, said first and third disks having first opposed toroidal races, and said second and third disks having second opposed races; a first plurality of rollers adjustably mounted for tractive contact with said first opposed races; and a second plurality of rollers mounted for tractive contact with said second opposed races, said second plurality of rollers being supported for planetary rotation about the axis of said shaft, the support for each of said first rollers comprising a bearing member carrying bearings for permitting rotation of each roller on its roller axis, a two-legged yoke having opposed slots in said legs, said slots being disposed at an angle of less than 90 degrees with respect to the axis of said disk, support means extending from each bearing member and into said slots, and means for rotatably supporting said yoke, whereby the surfaces of said yoke surrounding said slots bear against said support means to cause simultaneous rotation on the axis of precession and the contact axis, said contact axis extending between the points of contact of each roller with said first races, and said axis of precession of each roller being mutually perpendicular to said roller and contact axes.

2. In a toroidal actuator, the combination comprising: a rotatable input shaft, first and second disks coaxially mounted on said input shaft and fixed for rotation therewith, a third disk mounted coaxially with said input shaft intermediate said first and second disks, said third disk being freely rotatable with respect to said input shaft, said first and third disks having first opposed toroidal races, and said second and third disks having second opposed races; a first plurality of rollers adjustably mounted for tractive contact with said first opposed races; and a second plurality of rollers mounted for tractive contact with said second opposed races, said second plurality of rollers being supported for planetary rotation about the axis of said shaft, the support for each of said first rollers comprising a ball member carrying bearings for permitting rotation of each roller on its roller axis, a yoke having an inner contoured surface constituting a socket member for rotatably containing said ball member, said yoke having slots at said contoured surface, said slots being disposed at an angle of less than 90 degrees with respect to the axis of said disks, support means extending from each ball member and into said slots, and means for rotatably supporting said yoke, whereby the surfaces of said yoke surrounding said slots bear against said support means to cause simultaneous rotation on the axis of precession and the contact axis, said contact axis extending between the points of contact of each roller with said first races, and said axis of precession of each roller being mutually perpendicular to said roller and contact axes.

3. The invention as defined in claim 2 wherein said support means comprises first and second spaced pins.

4. In a toroidal actuator having a driving disk mounted coaxially with a driven disk, said disks having opposed toroidal races and a roller in tractive contact with said races, an adjustable mounting for said roller comprising: a bearing member; means mounting said roller on said bearing member for rotation on its roller axis; a yoke having opposed legs, first and second opposed slots in said legs; support means for said bearing member extending between said legs and into said slots; and means for rotating said yoke, whereby said bearing rotates within said yoke to steer said roller on its contact axis between the points of contact of said roller and said disks and to precess said roller on its axis of precession, said axis of precession being mutually perpendicular to said roller axis and said contact axis.

5. The invention as defined in claim 4 wherein said slots in said yoke are disposed at an angle to the axes of said disks; and wherein said supporting means provides first and second spaced surfaces against which the surfaces of the yoke surrounding said slot bear.

6. A toroidal actuator having a driving disk mounted coaxially with a driven disk, said disks having opposed toroidal races; a roller in tractive contact with said races; a bearing, said roller being mounted on said bearing for rotation on the axis of said roller; a yoke having opposed legs, first and second elongated slots in said legs, said slots being disposed at an acute angle with respect to the disk axis, support means having two spaced surfaces disposed parallel to the roller axis and extending from said bearing into said slots; and means for rotating said yoke whereby rotation of said yoke causes the surfaces surrounding said slots to bear against said spaced surfaces to cause a simultaneous rotation of said bearing on the contact axis and the axis of precession of said roller, said contact axis being between the points of contact of said roller with said disks and said axis of precession being mutually perpendicular to said roller axis and said contact axis.

7. A toroidal actuator having a driving disk mounted coaxially with a driven disk, said disks having opposed toroidal races; a roller in tractive contact with said races; a ball and socket, said roller being mounted on said ball for rotation on the axis of said roller; an elongated slot in said socket, said slot being disposed at an angle with respect to said disk axis, two spaced pins disposed parallel to the roller axis and extending from said ball into said slot; and means supporting said socket for rotation, whereby rotation of said socket causes the surface of said slot to bear against said pins to cause a simultaneous rotation of said ball on the contact axis between the points of contact of said roller with said disks and on the axis of precession which is mutually perpendicular to said roller axis and said contact axis.

8. A toroidal actuator having a driving disk mounted coaxially with a driven disk, said disks having opposed toroidal races; a roller in tractive contact with said races; a yoke for adjustably supporting said roller, said yoke having two spaced walls having opposed surfaces contoured to form a socket member; a ball member rotatably supported in said socket member, said roller being rotatably mounted on said ball member; a shaft extending from said yoke at right angles to the axis of said disks; a slot in each of said walls at said socket member, said slots being disposed parallel to each other and at an acute angle to said disk axis; two spaced pins disposed parallel to the roller axis and extending through said ball member into said slots; and means for rotating said shaft whereby the surface of said slots bears against said pins to cause said rollers to simultaneously rotate on its contact axis and to precess on its axis of precession, said contact axis extending from the points of contact of said roller and said races and said axis of precession being mutually perpendicular to said roller axis and said contact axis.

References Cited in the file of this patent
UNITED STATES PATENTS

| | | |
|---|---|---|
| 2,646,696 | Kepes | July 28, 1953 |
| 2,856,784 | Weisel | Oct. 21, 1958 |

FOREIGN PATENTS

| | | |
|---|---|---|
| 376,760 | Italy | Nov. 24, 1939 |